United States Patent … US 7,746,841 B2
Meiling et al. (45) Date of Patent: Jun. 29, 2010

(54) TRANSMISSION OF DATA PACKETS IN A RADIOCOMMUNICATION SYSTEM USING A COMMON HYBRID AUTOMATIC REPEAT REQUEST (HARQ) PROCESS

(75) Inventors: Axel Meiling, Berlin (DE); Fariba Raji, Vienna (AT); Jörg Schniedenham, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 928 days.

(21) Appl. No.: 10/487,416

(22) PCT Filed: Aug. 19, 2002

(86) PCT No.: PCT/EP02/09263

§ 371 (c)(1),
(2), (4) Date: Jul. 2, 2004

(87) PCT Pub. No.: WO03/019875

PCT Pub. Date: Mar. 6, 2003

(65) Prior Publication Data

US 2004/0233887 A1 Nov. 25, 2004

(30) Foreign Application Priority Data

Aug. 22, 2001 (DE) ................. 101 41 091

(51) Int. Cl.
*H04J 3/24* (2006.01)
*H04W 4/00* (2009.01)
*H04L 12/28* (2006.01)
(52) U.S. Cl. .................. 370/349; 370/338; 370/394
(58) Field of Classification Search .................. 370/394, 370/236, 338, 349
See application file for complete search history.

(56) References Cited

U.S. PATENT DOCUMENTS

| 5,901,143 | A | * | 5/1999 | Rotter et al. | ................. 370/329 |
| 5,987,018 | A | | 11/1999 | Freeburg et al. | |
| 6,496,481 | B1 | * | 12/2002 | Wu et al. | ..................... 370/242 |
| 2002/0001296 | A1 | * | 1/2002 | Lee et al. | ..................... 370/338 |

(Continued)

FOREIGN PATENT DOCUMENTS

EP 0635952 1/1995

(Continued)

OTHER PUBLICATIONS

Technical Report, 3GPP TR 25.950 V4.0.0 (Mar. 2001), 3rd Generation Partnership Project, Technical Specification Group Radio Access Network, UTRA High Speed Downlink Packet Access (Release 4), pp. 1-27.

(Continued)

*Primary Examiner*—George Eng
*Assistant Examiner*—Christopher M Brandt

(57) ABSTRACT

Data packets of a data flow are identified for transmission in a radio communication system with a data flow and/or individual service indicator enabling them to be allocated to the corresponding data flow for reception. A sequence number for the data packets in each data flow is added upon transmission to the data packet in order to reestablish the original order of the data packets of a data flow; the advantage thereof being that the data flows of several services can use a common HARQ process, whereupon the memory used for reception according to said HARQ process can be reduced.

27 Claims, 3 Drawing Sheets

U.S. PATENT DOCUMENTS

| | | | | |
|---|---|---|---|---|
| 2002/0015416 | A1* | 2/2002 | Lee et al. | 370/466 |
| 2002/0071407 | A1* | 6/2002 | Koo et al. | 370/335 |
| 2002/0159412 | A1* | 10/2002 | Odenwalder et al. | 370/335 |
| 2002/0172208 | A1* | 11/2002 | Malkamaki | 370/400 |
| 2002/0191544 | A1* | 12/2002 | Cheng et al. | 370/236 |

FOREIGN PATENT DOCUMENTS

| | | |
|---|---|---|
| EP | 0993149 | 4/2000 |
| EP | 0993149 A2 | 4/2000 |

OTHER PUBLICATIONS

Technical Report, ETSI TS 125 321 V5.0.0 (Mar. 2001), Universal Mobile Telecommunications System (UMTS), Medium Access Control (MAC) Protocol Specification (3GPP TS 25.321 Version 5.0.0 Release 5), pp. 1-54.

Otsuki et al., "Shared-Sequence-Number ARQ Scheme for Multi-Media Wireless Communications Systems", May 16, 1999, pp. 953-957.

Maguire et al., "Highspeed im Mobilnetz", Jan. 1, 2001, pp. 43-46.

Maguire R. et al. "Highspeed Im Motiilnetz Mit Standards Wie GRPS Surfen Nutzer Wei Im Festnetz-ISDN", Net-Zeitschrift Fuer Fommunickationsmanagement, Huthig Verlag, Heidelberg, DW, vol. 55, Nr. 1/2, Jan. 1, 2001, pp. 43-46, XP001001948, issn: 0947-4765, p. 44, middle column, lines 14-31.

Otsuki S et al: "Shared-Sequence Number ARQ Scheme for Multi-Media Wireless Communication Systems" 1999 IEEE $49^{th}$. Vehicular Technology Conference, Houston, TX May 16-20, 1999, IEEE Vehicual Technology Conference, New York, NY: IEEE: US, vol. 2, Conf. 49, May 16, 1999 pp. 953-957, XP000903188 ISBN: 0-7803-5566-0, Abstract p. 954 left column, pp. 7-17.

"Universal Mobile Telecommunications Systems (UMTS): Medium Access Control (MAC) protocol specification (3GPP TS 25.321 version 5.0.0 Release 5) ETSI TS 125 321 V5.0.0 (@002-03)" ETSI 3GPP, Mar. 2002, pp. 1-53, XP002222164.

3GPP TR 25.950 V40.0 (Mar. 2001) $3^{rd}$ Generation Partnership Project; Technical Specifiacation Group Radio Access Network; UTRA High Speed Downlink Packet Access (Release 4).

"Patent Abstract of Japan, JP2000-134169 issued May 12, 2000".

"Patent Abstract of Japan, JP07-038540 issued Feb. 7, 1995".

* cited by examiner

Figure 1: Retransmission and Re-sequencing entities in the *receiver side*

Figure 2: HARQ Receiver Procedures

TRANSMISSION OF DATA PACKETS IN A RADIOCOMMUNICATION SYSTEM USING A COMMON HYBRID AUTOMATIC REPEAT REQUEST (HARQ) PROCESS

CROSS REFERENCE TO RELATED APPLICATIONS

This application is based on and hereby claims priority to PCT Application No. PCT/EP02/09263 filed on Aug. 19, 2002 and German Application No. 101 41 091.3 filed on Aug. 22, 2001, the contents of which are hereby incorporated by reference.

BACKGROUND OF THE INVENTION

The invention relates to a method and a radio station for transmitting data packets in a radio communication system, in particular in a mobile radio system.

In radio communication systems, information (such as voice, image information or other data) is transmitted with the aid of electromagnetic waves over a radio interface between a sending and a receiving radio station (base station and mobile station). The electromagnetic waves are radiated using carrier frequencies lying in the frequency band provided for the respective system. Frequencies in the frequency band of approximately 2000 MHz are provided for future mobile radio systems employing CDMA or TD/CDMA transmission methods over the radio interface, for example the UMTS (Universal Mobile Telecommunications System) or other 3rd-generation systems. Frequency Division Multiplex Access (FDMA), Time Division Multiplex Access (TDMA), or a method known as Code Division Multiplex Access (CDMA) here serve to distinguish the signal sources.

As part of the standardization of the UMTS standard, methods are currently being specified which support efficient transmission of data packets. So-called hybrid ARQ (HARQ) methods are an important technology in this area. Hybrid ARQ methods derive their advantage from the fact that incorrectly received data packets are stored in a storage facility (buffer) in the receiving device so that they can be combined with succeeding, repeated and, where applicable, modified transmissions of the data packets. In contrast to known pure ARQ methods in which faulty data packets are rejected, this advantageously also makes it possible to benefit from faulty data packets to increase the quality of reception. The data packets which are saved in this receiver-side buffer must be able to be read out very quickly so that no unnecessary delays occur in the data transmission and analysis. Storage facilities with this attribute are usually very expensive.

The system of what is termed High Speed Downlink Packet Access (HSDPA) which is currently specified for the UMTS also claims to be able to cater for different services with different Quality of Service (QoS) requirements simultaneously. These different QoS requirements of the data also necessitate a different form of processing of the respective data in the HARQ process. Furthermore it is necessary for the data packets of a service which arrive at the receiver to be reordered into the correct sequence. Typically, the receiver will not receive the data packets in the correct sequence since individual data packets can be disrupted during the transmission over the radio interface and have to be requested again via the ARQ mechanism, whereas other data packets originally transmitted at a later time are immediately received correctly.

In order to satisfy these requirements it is proposed to provide a separate HARQ process for each service. However, this disadvantageously leads to the size of the buffer required for the HARQ process having to be multiplied by the number of different services, which means that a large and expensive buffer or a plurality of buffers must be provided in readiness.

SUMMARY OF THE INVENTION

One possible object of the invention is to specify a method and a radio station which allow more efficient use of the buffer.

The inventors propose that data streams of a plurality of services should use a common HARQ process. In this way the buffer to be provided on the receive side for the HARQ process can advantageously be reduced in size compared to the method described in the introductory remarks.

In order to differentiate between different QoS requirements of the services, the data packets to be transmitted and/or stored on the send side can be linked with a corresponding request. This can be accomplished, for instance, in such a way that each data packet is linked with an indication of the possible number of further transmissions. This depends where necessary on the respective maximum possible delay in the transmission. Real-time services such as, for example, voice or video transmission have a shorter maximum possible delay than non-real-time services such as, for example, a downloading of Internet content.

A memory known as a reordering buffer, i.e. a receive-side storage facility by which the received data packets are restored to the original sequence of the data stream prior to further processing, can be provided for each service separately. As this buffer is relatively slow and consequently reasonably priced, it is possible to provide a plurality of large buffers.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
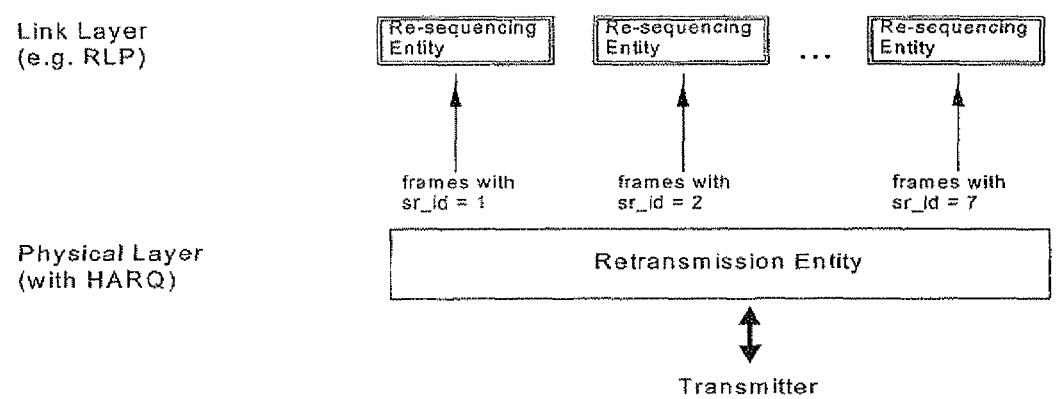
FIG. 1 is a block diagram of the structure of a radio communication system.

Reference will now be made in detail to the preferred embodiments of the present invention, examples of which are illustrated in the accompanying drawings, wherein like reference numerals refer to like elements throughout.

FIG. 1 shows an exemplary radio communication system having a plurality of switching facilities MSC (Mobile Switching Center) which are interconnected. At least one of the switching facilities MSC generally provides a point of access to further communication systems such as, for example, a fixed network communication system. Base stations NB (Node B) are connected to the switching facilities MSC as send/receive facilities of the radio communication system. The base stations NB are linked via communication connections to terminals, specifically to user terminals UE (User Equipment), it being possible for the terminals to be mobile or stationary terminals.

Between the base station NB shown in FIG. 1 and the user terminal UE there can exist a unidirectional or a bidirectional communication connection with an uplink UL from the user terminal UE to the base station NB and/or a downlink DL from the base station NB to the user terminal UE.

Figure 2:
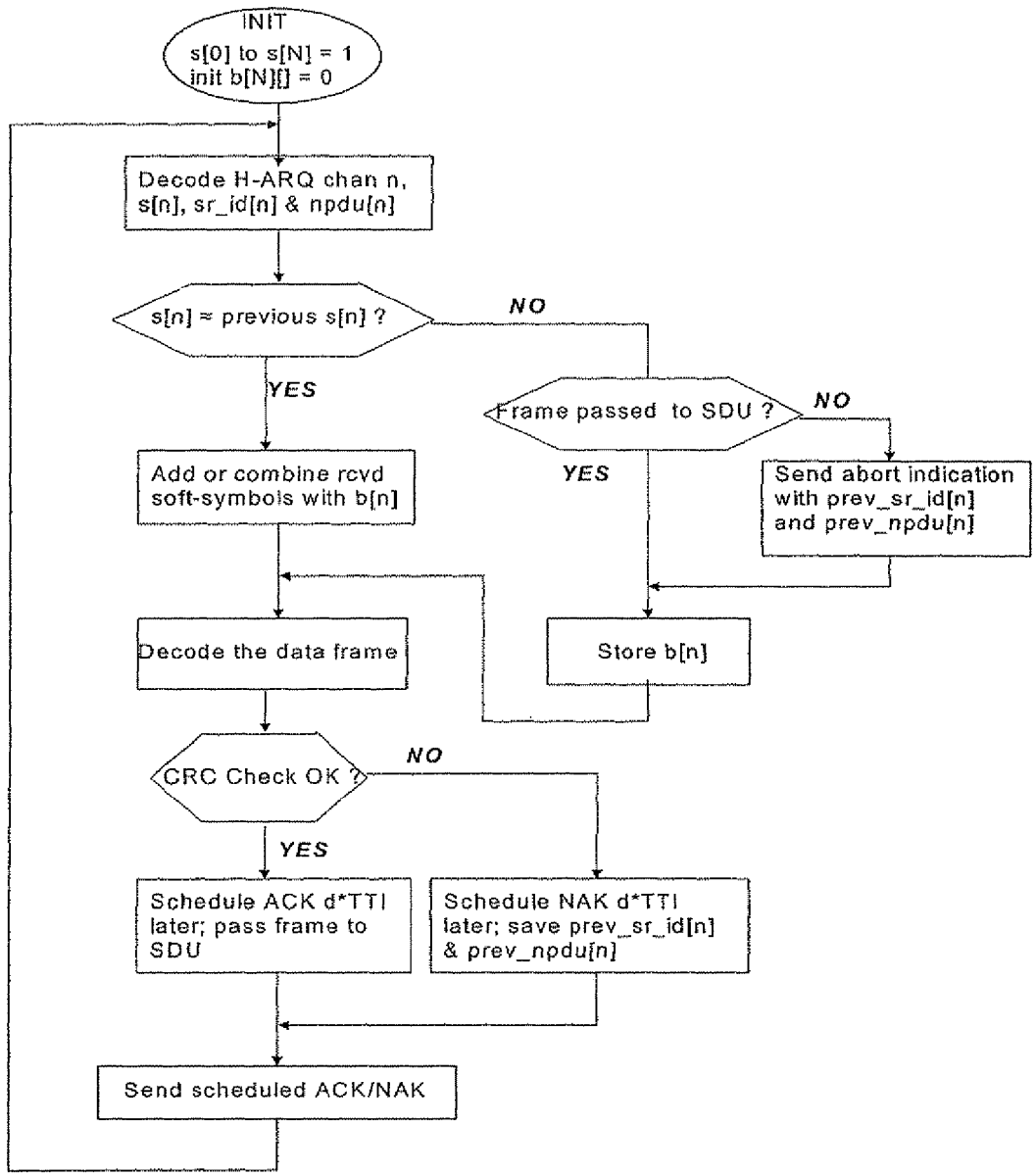
FIG. 2 is a schematic representation of the procedural flows according to one aspect of the invention in a sending and a receiving radio station.

FIG. 2 is a schematic showing functionalities and facilities of a sending Tx (transmission) and a receiving Rx (reception) radio station. The functionalities for transmission and reception can be realized in a user terminal and a base station in each case.

First, data for transmission via the radio interface is selected on the send side. In the example shown in FIG. 2, the data of different services are identified by two data streams 1, 2. In a step 3, a data stream, data stream 1 in the example shown, and also a possible transmission channel and/or a transport format are selected. Next, in step 4, the data packets of data stream 1 are provided with a data stream identification. In this case, in the event that multiple data packets of a data stream are to be transmitted simultaneously, these data packets can be linked together (concatenated). Furthermore, the data packets in step 4 are provided with a data stream- or service-specific sequence number. Following this, in step 5, a respective CRC checksum, as it is called, is appended to the data packets, the checksum enabling transmission errors to be identified on the receive side.

Figure 3:
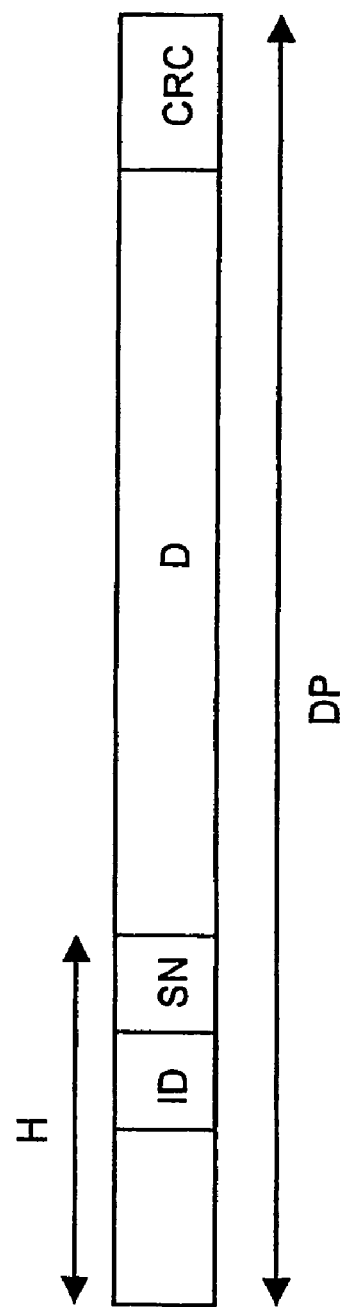
FIG. 3 shows the structure of a data packet for transmission over the radio interface.

A data packet DP supplemented in this way is shown by way of example in FIG. 3. In this case the header H of the data packet DP has been supplemented by a data stream identifier ID and a sequence number SN. The header H and the actual useful data D are terminated by a checksum CRC. The data packet DP can also be implemented in the same way in a different configuration of the individual elements than that shown, without thereby leaving the range of the invention.

The data packets of data stream 1 are subsequently, in step 6, time-multiplexed with data packets stored in a transmission buffer on the send side and held in reserve for retransmission in the event of an incorrect transmission and, in step 8, transmitted via the radio interface to the receiving radio station Rx. The data packet transmitted in each case is then held in the transmission buffer until a positive acknowledgement of the reception is received or, on account of the QoS requirements, such as, for example, maximum possible transmission delay, a retransmission of the data packet is deemed not to be useful.

In the receiving radio station Rx, the data packets are received in step 9 and stored in a fast receive buffer 10. Then, in step 11, the checksum CRC of each of the data packets is checked. If it is established in step 11 that the checksum is correct, in step 12 the sending radio station Tx is signaled by an ACK (Acknowledge) message that the data packet has been successfully received. This data packet can then be deleted from the transmission buffer 7 and the receive buffer 10. If, on the other hand, it is established in step 11 that the data packet has been incorrectly received and the errors cannot be rectified by the redundancy, in step 12 the sending radio station Tx is signaled by a NACK (Negative Acknowledge) message that the data packet has to be retransmitted. This means that the data packet will continue to be held in the transmission buffer 7 and in the receive buffer 10 until it has been correctly received or, if applicable, a maximum possible transmission delay has been exceeded.

In step 13, in the receiving radio station Rx, the successfully received data packets of the data stream are assigned by the data stream indicator to a service-specific reordering buffer 14 or 15 in which the original sequence of the data packets of a data stream is restored. This respective data stream 1 or 2 can subsequently be further processed in the known manner on the receive side. Alternatively, the reordering buffer can also be used collectively for all services, since the data packets of the individual data streams can be uniquely assigned by the data stream indicators.

The invention has been described in detail with particular reference to preferred embodiments thereof and examples, but it will be understood that variations and modifications can be effected within the spirit and scope of the invention.

What is claimed is:

1. A method for transmitting data packets according to a hybrid automatic repeat request (HARQ) process in a radio communication system comprising:
   communicating data packets through a first radio station having a send side, the data packets relating to different respective services, the data packets being communicated through at least two data streams;
   marking data packets on the send side of the first radio station with an indicator, the indicator identifying the data stream of the data packet and/or the service of the data packet;
   assigning the data packets to at least two data streams on the receive side of a second radio station, based on the indicator; and
   using a common HARQ process for both of the at least two data streams, a common HARQ process for the data packets being communicated through the at least two data streams.

2. A method according to claim 1, wherein the indicator contains sequence number information.

3. The method according to claim 2, wherein
   for simultaneous transmission of a plurality of data packets of a data stream, data packets are concatenated into groups, and
   the sequence number information is assigned to a group of data packets instead of individual data packets.

4. Method according to claim 1, wherein
   the HARQ process confirms correct or incorrect reception of the data packets.

5. The method according to claim 1, further comprising storing the received data packets in a receive buffer implemented on the receive side.

6. The method according to claim 2, further comprising:
   storing received data packets in a data stream or service-specific reordering buffer; and
   restoring the data packets to their original sequence based on the sequence number information.

7. The method according to claim 1, further comprising storing transmitted data packets in a transmission buffer implemented on the send side.

8. Method according to claim 3, wherein
   the HARQ process confirms correct or incorrect reception of the data packets.

9. The method according to claim 8, further comprising storing the received data packets in a receive buffer implemented on the receive side.

10. The method according to claim 9, further comprising:
    storing received data packets in a data stream or service-specific reordering buffer; and
    restoring the data packets to their original sequence based on the sequence number information.

11. The method according to claim 10, further comprising storing transmitted data packets in a transmission buffer implemented on the send side.

12. The method according to claim 1, wherein the HARQ process is performed on the data packets after reception, before the data packets are separated into the at least two data streams.

13. A method according to claim 1, wherein the first radio station is a base station and the second radio station is user equipment.

14. A method according to claim 1, wherein the first radio station is user equipment and the second radio station is a base station.

15. A method according to claim 1, wherein the first and second radio stations are base stations.

16. A method according to claim 1, wherein the first and second radio stations are user equipment.

17. A radio station of a radio communication system for transmitting and receiving data packets according to a hybrid automatic repeat request (HARQ) process, comprising:
- a transmitter to transmit data packets from at least two data streams relating to at least two respective services;
- a receiver to receive data packets and output at least two data streams;
- means for adding a data stream indicator and/or a service indicator to the data packets; and
- means for performing a common HARQ process for the at least two data streams.

18. The radio station according to claim 17, further comprising means for adding at least one of a data stream specific sequence number and a service-specific sequence number to the data packets of the at least two data streams.

19. The radio station according to claim 17, further comprising means for confirming correct or incorrect reception of data packets using the HARQ process.

20. The radio station according to claim 17, further comprising a receive buffer for storing received data packets of the at least two data streams.

21. The radio station according to claim 17, further comprising a transmission buffer for storing transmitted data packets of the at least two data streams.

22. The radio station according to claim 17, further comprising means for confirming correct or incorrect reception of data packets using the HARQ process.

23. The radio station according to claim 22, further comprising a receive buffer for storing received data packets of the at least two data streams.

24. The radio station according to claim 23, further comprising a transmission buffer for storing transmitted data packets of the at least two data streams.

25. The radio station according to claim 17, wherein the HARQ process is performed on the data packets after reception, before the data packets are separated into the at least two data streams.

26. A transceiver comprising:
- a transmitter unit to transmit data packets from at least two data streams relating to at least two respective services;
- a receiver unit to receive data packets and output at least two data streams;
- an add unit to add a data stream indicator and/or a service indicator to the data packets; and
- an HARQ unit to perform a common hybrid automatic repeat request (HARQ) process on received data packets before the received data packets are separated into two data streams.

27. A radio communication system comprising:
- a first radio station having a send side, the send side communicating data packets relating to different respective services, the data packets being communicated through at least two data streams;
- the send side of the first radio station marking data packets with an indicator, the indicator identifying the data stream of the data packet and/or the service of the data packet;
- a second radio station having a receive side, the receive side assigning the data packets to at least two data streams based on the indicator; and
- using a common hybrid automatic repeat request (HARQ) process for both of the at least two data streams.

* * * * *